(12) United States Patent
Kondo

(10) Patent No.: US 8,466,222 B2
(45) Date of Patent: Jun. 18, 2013

(54) RUBBER COMPOSITION FOR SIDEWALLS AND PNEUMATIC TIRE PRODUCED USING THE SAME

(75) Inventor: Toshikazu Kondo, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 64 days.

(21) Appl. No.: 12/601,232

(22) PCT Filed: Mar. 7, 2008

(86) PCT No.: PCT/JP2008/054116
§ 371 (c)(1),
(2), (4) Date: Nov. 20, 2009

(87) PCT Pub. No.: WO2008/149586
PCT Pub. Date: Dec. 11, 2008

(65) Prior Publication Data
US 2010/0174023 A1 Jul. 8, 2010

(30) Foreign Application Priority Data
Jun. 8, 2007 (JP) .................................. 2007-153025

(51) Int. Cl.
*C08K 3/26* (2006.01)
(52) U.S. Cl.
USPC ........... 524/424; 524/426; 524/430; 524/437; 524/445; 524/449; 524/451; 152/555
(58) Field of Classification Search .................. 524/430, 524/437, 445, 449, 451, 492, 493, 495, 496, 524/424–427
See application file for complete search history.

(56) References Cited

U.S. PATENT DOCUMENTS

| | | | |
|---|---|---|---|
| 6,789,591 B2 * | 9/2004 | Ikeda ........................... | 152/523 |
| 2002/0068784 A1 | 6/2002 | Rauline | |
| 2002/0173574 A1 * | 11/2002 | Meier et al. ................... | 524/430 |
| 2003/0100643 A1 | 5/2003 | Kikuchi | |
| 2003/0100661 A1 * | 5/2003 | Kikuchi et al. ............... | 524/492 |
| 2003/0234067 A1 | 12/2003 | Kataoka et al. | |
| 2004/0162379 A1 * | 8/2004 | Ajbani et al. ................. | 524/447 |
| 2005/0085583 A1 * | 4/2005 | Hong ............................ | 524/492 |
| 2005/0098252 A1 | 5/2005 | Muraoka et al. | |
| 2005/0209390 A1 * | 9/2005 | Yagi et al. ..................... | 524/493 |
| 2006/0118227 A1 * | 6/2006 | Miki .............................. | 152/524 |
| 2006/0183840 A1 * | 8/2006 | Hirayama et al. ............ | 524/493 |
| 2007/0049670 A1 | 3/2007 | Wada et al. | |
| 2007/0254983 A1 * | 11/2007 | Lapra ............................ | 523/200 |
| 2007/0299192 A1 | 12/2007 | Hirayama et al. | |
| 2010/0190907 A1 | 7/2010 | Mizuno et al. | |

FOREIGN PATENT DOCUMENTS

| | | |
|---|---|---|
| CN | 1821292 A | 8/2006 |
| CN | 1919909 A | 2/2007 |
| EP | 2 163 578 A1 | 3/2010 |
| JP | 8-067776 A | 3/1996 |
| JP | 2003-64222 A | 3/2003 |
| JP | 2004-26862 A | 1/2004 |
| JP | 2005-53944 A | 3/2005 |
| JP | 2008-070093 A | 3/2006 |
| JP | 2006-89526 A | 4/2006 |
| JP | 2006-143929 A | 6/2006 |
| JP | 2006-219631 A | 8/2006 |
| JP | 2008-1861 A | 1/2008 |
| JP | 2008-31435 A | 2/2008 |
| JP | 2008-56802 A | 3/2008 |
| JP | 2008-303265 A | 12/2008 |
| JP | 2008-303325 A | 12/2008 |
| RU | 2 250 834 C2 | 4/2005 |
| WO | WO 2008/149585 A1 | 12/2008 |

OTHER PUBLICATIONS

Chinese Office Action in Application No. 200880019240.9 mailed on May 25, 2011.
Japanese Office Action in Application No. 2007-153025 mailed on Jun. 7, 2011.
Rubber Industry Handbook, Second Part, Compounding Agent, Editor Group, pp. 193-249, Chemical Industry Press, (1976).
Chinese Office Action, dated Oct. 19, 2011, for Chinese Application No. 200880019240.9.
Database WPI, Week 200641, Thomson Scientific, Database Accession No. 2006-396280, 2006, XP-002660038.
Supplementary European Search Report, dated Oct. 7, 2011, for European Application No. 08721534.9.
Decision to Grant a Patent for an Invention issued Aug. 14, 2002, in Russian Patent Application No. 2009143272/05, with English translation.

* cited by examiner

*Primary Examiner* — Peter Szekely
(74) *Attorney, Agent, or Firm* — Birch Stewart Kolasch & Birch, LLP

(57) ABSTRACT

Provided are a rubber composition for sidewalls containing 100 parts by mass of a rubber component consisting of at least a natural rubber or a modified natural rubber, 5 parts by mass or less of carbon black, 10 to 40 parts by mass of silica and 5 to 30 parts by mass of an inorganic filler component composed of one kind or two or more kinds of inorganic filler excluding carbon black and silica, and a pneumatic tire provided with a sidewall rubber prepared using the rubber composition. The used amounts of raw materials derived from petroleum resources have been reduced in this rubber composition. Moreover, the rubber composition exhibits low fuel consumption due to low rolling resistance and good flex crack growth resistance.

7 Claims, 1 Drawing Sheet

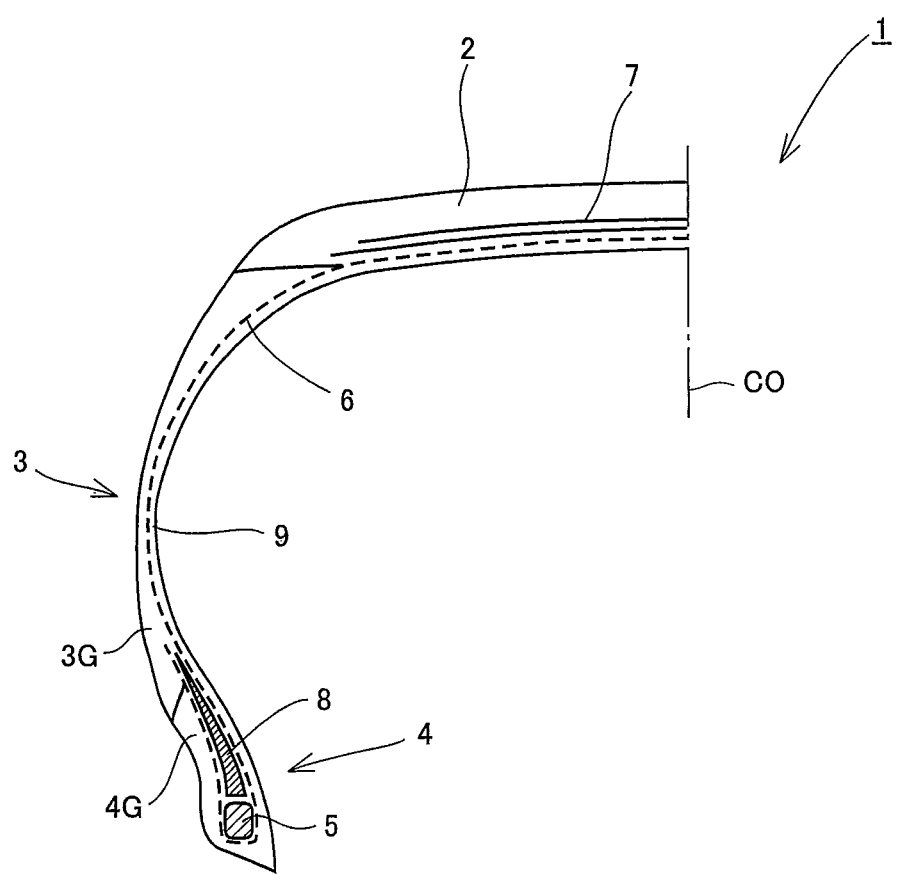

RUBBER COMPOSITION FOR SIDEWALLS AND PNEUMATIC TIRE PRODUCED USING THE SAME

TECHNICAL FIELD

The present invention relates to a rubber composition for sidewalls and to a pneumatic tire provided with a sidewall rubber produced using the rubber composition for sidewalls.

BACKGROUND ART

Due to recent increase in interest in environmental issues, the method for reducing the used amount of raw materials derived from petroleum resources have been investigated in various technical fields. As to tires currently on the market, a half or more of the total weight of a tire is composed of raw materials derived from petroleum resources. For example, since general tires for passenger cars contain such as synthetic rubber in about 20% by mass, carbon black in about 20% by mass, softeners and synthetic fibers, about 50% by mass or more of a whole tire is composed of raw materials derived from petroleum resources. Therefore, there is a demand for development of rubbers for tires prepared using raw materials derived from non-petroleum resources, the tires satisfying required properties equal to or higher than those required when raw materials derived from petroleum resources are used. For example, as to sidewall rubbers of tires, it is required to reduce rolling resistance and secure satisfactory flex crack growth resistance while maintaining physical properties for obtaining desired durability.

Japanese Patent Laying-Open No. 2003-64222 (Patent Document 1) proposes, for the purpose of providing a rubber composition which can reduce rolling resistance with decreasing consumption of petroleum oils, a rubber composition including 5 to 150 parts by weight of an inorganic filler, 0 to 30 parts by weight of a silane coupling agent and 5 to 100 parts by weight of a vegetable oil having an iodine value of 130 or less, based on 100 parts by weight of a diene rubber. However, this document proposes no rubber composition capable of exhibiting both low rolling resistance and satisfactory flex crack growth resistance when used as a sidewall rubber of a tire.

Japanese Patent Laying-Open No. 2005-53944 (Patent Document 2) proposes, for the propose of providing a rubber composition for sidewalls which can achieve low fuel consumption, a rubber composition for sidewalls containing 1 to 20 parts by weight of a composite agent composed of starch and a plasticizer based on 100 parts by weight of a rubber component composed of natural rubber and/or isoprene rubber and butadiene rubber. However, this document proposes no rubber composition which exhibits both low rolling resistance and satisfactory flex crack growth resistance.

Japanese Patent Laying-Open No. 2006-89526 (Patent Document 3) proposes, for the purpose of providing a rubber composition for tires which keeps performances needed as tire members and is improved in processability, a rubber composition for tires containing 30 parts by weight or more of silica, 5 to 15 parts by weight of calcium carbonate and 5 parts by weight or less of carbon black based on 100 parts by weight of a rubber component composed of a natural rubber and/or a modified product thereof. However, this document proposes no rubber composition capable of exhibiting both low rolling resistance and satisfactory flex crack growth resistance when used as a sidewall of a tire.

Patent Document 1: Japanese Patent Laying-Open No. 2003-64222

Patent Document 2: Japanese Patent Laying-Open No. 2005-53944

Patent Document 3: Japanese Patent Laying-Open No. 2006-89526

DISCLOSURE OF THE INVENTION

Problems to be Solved by the Invention

An object of the present invention is to solve the above-mentioned problems and provide a rubber composition for sidewalls which is capable of reducing the used amount of raw materials derived from petroleum resources and exhibiting both low fuel consumption due to low rolling resistance and good flex crack growth resistance, and pneumatic tires provided with a sidewall rubber produced using the rubber composition for sidewalls.

Means for Solving the Problems

The present invention provides a rubber composition for sidewalls containing 100 parts by mass of a rubber component, 5 parts by mass or less of carbon black, 10 to 40 parts by mass of silica and 5 to 30 parts by mass of an inorganic filler component composed of one kind or two or more kinds of other inorganic filler excluding the carbon black and the silica, wherein the rubber component consists of at least a natural rubber or a modified natural rubber.

In the rubber composition for sidewalls of the present invention, the rubber component preferably consists of at least a natural rubber or an epoxidized natural rubber.

In the rubber composition for sidewalls of the present invention, the inorganic filler components preferably contain at least one kind selected from the group consisting of calcium carbonate, clay, sericite, alumina, talc, aluminum hydroxide, magnesium carbonate, titanium oxide and mica.

The rubber composition for sidewalls of the present invention preferably has a durometer A hardness of 50 or less after its crosslinking.

The present invention also provides a pneumatic tire provided with a sidewall rubber produced using any one of the aforementioned rubber compositions for sidewalls.

Effects of the Invention

According to the present invention, it is possible to provide a rubber composition for sidewalls which is capable of reducing the amount of raw materials derived from petroleum resources and exhibiting both low fuel consumption due to low rolling resistance and satisfactory flex crack growth resistance, and a pneumatic tire provided with a sidewall rubber prepared by using the rubber composition for sidewalls, the tire having both low fuel consumption due to low rolling resistance and satisfactory flex crack growth resistance.

BRIEF DESCRIPTION OF THE DRAWINGS

FIG. 1 is a sectional view showing the left half of a pneumatic tire according to the present invention.

DESCRIPTION OF THE REFERENCE SIGNS

1 Pneumatic tire, 2 tread portion, 3 sidewall portion, 4 bead portion, 5 bead core, 6 carcass, 7 belt layer, 8 bead apex rubber, 9 inner liner rubber, 3G sidewall rubber, 4G clinch apex rubber.

BEST MODES FOR CARRYING OUT THE INVENTION

The rubber composition for sidewalls of the present invention contains 100 parts by mass of a rubber component, 5 parts by mass or less of carbon black, 10 to 40 parts by mass of silica and 5 to 30 parts by mass of an inorganic filler component composed of one kind or two or more kinds of other inorganic filler excluding the carbon black and the silica (hereinafter simply also referred to as inorganic filler component). In addition the rubber component consists of at least a natural rubber or a modified natural rubber. In the present invention, by using a natural rubber and/or a modified natural rubber as a rubber component and using a relatively small amount of carbon black, a predetermined amount of silica and a predetermined amount of the aforementioned inorganic filler component in combination, it is possible to reduce the content of raw materials derived from petroleum resources, such as synthetic rubber and carbon black. Moreover, by using a relatively small amount of carbon black and using predetermined amounts of silica and the aforementioned inorganic filler component in combination, it is possible to reduce tan δ (loss tangent) and also to secure satisfactory tensile strength and elongation at break. The reduction in the tan δ of the rubber composition for sidewalls contributes to reduction in the rolling resistance of a pneumatic tire provided with a sidewall rubber produced using the rubber composition for sidewalls, and the securing of the tensile strength and the elongation at break of the rubber composition for sidewalls contributes to securing flex crack growth resistance of the pneumatic tire.

<Rubber Component>

In the rubber composition for sidewalls of the present invention, the rubber component consists of at least a natural rubber or a modified natural rubber. Any substance generally known as natural rubber can be used as the natural rubber without any limitation on the place of its origin and the like, and one kind of natural rubber or two or more kinds of natural rubbers in combination may be used. As the natural rubber, natural rubbers of a grade such as RSS#3 and TSR can be preferably used. Examples of the modified natural rubber include an epoxidized natural rubber (ENR) and a hydrogenated natural rubber. One kind of modified natural rubber or two or more kinds of modified natural rubbers in combination may be used.

Here, some or all of the natural rubber may be deproteinized natural rubber (DPNR), and some or all of the modified natural rubber may be a modified rubber of such deproteinized natural rubber (DPNR).

The rubber component preferably consists of at least a natural rubber or an epoxidized natural rubber (ENR).

The epoxidized natural rubber (ENR) is a kind of a modified natural rubber resulting from epoxidation of an unsaturated double bond of a natural rubber. The molecular cohesive force increases due to an epoxy group, which is a polar group. Therefore, it has a glass transition temperature (Tg) higher than that of natural rubber, and is superior in mechanical strength, abrasion resistance, and air permeation resistance. As such an epoxidation natural rubber, commercially available products such as ENR25 (manufactured by Kumpulan Guthrie Berhad) (epoxidation ratio: 25%) and ENR50 (manufactured by Kumpulan Guthrie Berhad) (epoxidation ratio: 50%) may be used. It may also use a product resulting from epoxidation of a natural rubber. The method for epoxidizing a natural rubber is not particularly limited and examples thereof include such as a chlorohydrin method, a direct oxidation method, a hydrogen peroxide method, an alkylhydroperoxide method, and a peracid method. Examples of the peracid method include a method of reacting an organic peracid, such as peracetic acid and performic acid, as an epoxidizing agent with an emulsion of a natural rubber.

The epoxidization ratio of the epoxidized natural rubber is preferably 10 mol % or more, and more preferably 20 mol %, and even more preferably 25 mol % or more. Here, the epoxidization ratio means a ratio of the number of the double bonds epoxidized in a natural rubber to all the number of double bonds in the natural rubber before its epoxidation, (namely, (the number of the double bonds epoxidized)/(the number of double bonds before epoxidation)). It can be obtained by such as titrimetric analysis, and nuclear magnetic resonance (NMR) analysis. When the epoxidation ratio of the epoxidized natural rubber is less than 10 mol %, the glass transition temperature of the epoxidized natural rubber is low, and therefore the mechanical strength of a sidewall rubber tends to become low. In addition, the epoxidization ratio of the epoxidized natural rubber is preferably 70 mol % or less, more preferably 60 mol % or less, and even more preferably 50 mol % or less. When the epoxidation ratio of the epoxidized natural rubber exceeds 70 mol %, the hardness of a sidewall rubber increases and the flex crack growth resistance of a pneumatic tire tends to become low.

More typically, examples of the epoxidized natural rubber include an epoxidized natural rubber having an epoxidation ratio of 25 mol % and an epoxidized natural rubber having an epoxidation ratio of 50 mol %.

The content of the natural rubber in the rubber component is preferably 50% by mass or more. This is because when the content of the natural rubber in the rubber component is less than 50% by mass, the rubber strength at break tends to decrease. The content of the natural rubber in the rubber component is more preferably 60% by mass or more. On the other hand, the content of the natural rubber in the rubber component is preferably 80% by mass or less. This is because when the content of the natural rubber in the rubber component exceeds 80% by mass, in the event, for example, that a butadiene rubber (BR) or the like is added for improving flexural fatigue resistance, the effect of improving the flexural fatigue resistance tends to become small due to a small added amount thereof. The content of the natural rubber in the rubber component is more preferably 70% by mass or less.

The content of the modified natural rubber in the rubber component is preferably 20% by mass or less. This is because when the content of the modified natural rubber in the rubber component exceeds 20% by mass, the cost tends to increases. The content of the modified natural rubber in the rubber component is more preferably 10% by mass or less.

<Carbon Black>

Carbon black functions as a filler for reinforcement. By blending carbon black, it is possible to increase the mechanical strength of a sidewall rubber to be obtained. The rubber composition for sidewalls of the present invention contains carbon black in an amount of 5 parts by mass or less based on 100 parts by mass of the rubber component. This is because when the content of carbon black exceeds 5 parts by mass based on 100 parts by mass of the rubber component, it becomes impossible to obtain a sufficient effect of reducing the used amount of raw materials derived from petroleum resources and, at the same time, the tan δ of a sidewall rubber increases. The content of carbon black is more preferably 4 parts by mass or less. On the other hand, when the content of carbon black is less than 1 part by mass, the mechanical strength of a sidewall rubber tends to become low, therefore the content of carbon black is preferably 1 part by mass or more, more preferably 2 parts by mass or more, and even more preferably 3 parts by mass or more.

A BET specific surface area of carbon black is preferably within the range of 40 to 300 m$^2$/g. This is because when the BET specific surface area of carbon black is less than 40 m$^2$/g, the mechanical strength of a sidewall rubber tends to become low and when exceeds 300 m$^2$/g, the processability tends to deteriorate due to decrease in the dispersibility of carbon black in the preparation of the rubber composition for sidewalls. The BET specific surface area of carbon black is more preferably 50 m$^2$/g or more, and even more preferably 60 m$^2$/g or less. In addition, the BET specific surface area is more preferably 280 m$^2$/g or less, and even more preferably 260 m$^2$/g or less.

Here, the BET specific surface area of the carbon black mentioned above can be measured, for example, by a method in accordance with JIS K6217.

Examples of preferably commercially available carbon black include such as "SHOWBLACK N220" and "SHOWBLACK N330" manufactured by CABOT JAPAN K.K.

<Silica>

Silica functions as a filler for reinforcement. By blending silica, it is possible to increase the mechanical strength of a sidewall rubber to be obtained. Moreover, since silica is derived from non-petroleum resources, it is possible to reduce the amount of raw materials derived from petroleum resources in the rubber composition in comparison with, for example, in the event that a reinforcing agent derived from petroleum resources, such as carbon black, is blended as a major reinforcing agent.

The rubber composition for sidewalls of the present invention contains silica in an amount within the range of 10 to 40 parts by mass based on 100 parts by mass of the rubber component. This is because when the content of silica is less than 10 parts by mass based on 100 parts by mass of the rubber component, a sufficient effect of reinforcing a sidewall rubber can not be obtained, and when exceeds 40 parts by mass, the processability tends to deteriorate due to increase in viscosity in the preparation of the rubber composition for sidewalls and, at the same time, flexural fatigue resistance also tends to deteriorate. The content of the silica is more preferably 20 parts by mass or more, it is even more preferably 30 parts by mass or less.

As silica, a product having a BET specific surface area within the range of 100 to 300 m$^2$/g is preferred. This is because when the BET specific surface area of silica is less than 100 m$^2$/g, the effect of reinforcing a sidewall rubber tends to become low and when exceeds 300 m$^2$/g, the processability tends to deteriorate due to decrease in the dispersibility of silica in the preparation of the rubber composition for sidewalls. The BET specific surface area of the silica is more preferably 110 m$^2$/g or more, and even more preferably 120 m$^2$/g or more. It is also more preferably 280 m$^2$/g or less, and even more preferably 260 m$^2$/g or less.

Here, the BET specific surface area of the silica mentioned above can be measured, for example, by a method in accordance with ASTM-D-4820-93.

Silica may be either a product prepared by a wet method or a product prepared by a dry method. In addition, examples of preferably commercially available products include such as Ultrasil VN2 (manufactured by Evonik Degussa Japan. Co., Ltd.) (BET specific surface area: 125 m$^2$/g) and Ultrasil VN3 (manufactured by Evonik Degussa Japan. Co., Ltd.) (BET specific surface area: 175m$^2$/g).

<Inorganic Filler Component>

The inorganic filler component in the present invention is composed of one kind or two or more kinds of inorganic filler excluding carbon black and silica. Examples of the inorganic filler component include calcium carbonate, clay, sericite, alumina, talc, aluminum hydroxide, magnesium carbonate, titanium oxide, and mica. In the present invention, the inorganic filler component is preferably composed of at least one kind selected from the inorganic fillers exemplified above in that it exerts satisfactory effect as a filler for reinforcement.

Here, in the present invention, clay is a general name for aggregates of fine particles produced by weathering or metamorphism of rocks or minerals and more typically means particles being mainly composed of clay minerals and having a particle diameter of 2 μm or less. The clay mineral referred to herein typically means crystalline or amorphous materials mainly composed of lamellar silicate. Specific examples of the clay include such as wet kaolin (non-calcined kaolin), calcined kaolin, and wet or dry pyrophyllite clay. Clays with surfaces treated with a silane coupling agent can also be exemplified.

The rubber composition for sidewalls of the present invention contains the inorganic filler component within a range of from 5 to 30 parts by mass based on 100 parts by mass of the rubber component. When the content of the inorganic filler component is less than 5 parts by mass based on 100 parts by mass of the rubber component, it becomes necessary, for example, to increase the content of silica in order to fully obtain a reinforcing effect on a sidewall rubber while reducing the used amount of raw materials derived from petroleum resources. In such a case, the processability is deteriorated due to increase in viscosity in the preparation of the rubber composition for sidewalls and, at the same time, the tan δ increases in comparison with the case where 5 parts by mass or more of the inorganic filler component is contained. In addition, when the content of the inorganic filler component exceeds 30 parts by mass, it becomes difficult both to maintain tensile strength and elongation at break and to secure processability at the time of production. The content of the inorganic filler component based on 100 parts by mass of the rubber component is more preferably 7 parts by mass or more, and even more preferably 10 parts by mass or more. It is also more preferably 25 parts by mass or less, and even more preferably 20 parts by mass or less.

<Silane Coupling Agent>

The rubber composition for sidewalls of the present invention contains silica as mentioned above. It is preferable that the rubber composition contain a silane coupling agent together with silica. As the silane coupling agent, conventionally known silane coupling agents can be used. Examples thereof include sulfide-based silane coupling agents such as bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilylethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis (4-trimethoxysilylbutyl) disulfide, 3-trimethoxysilylpropyl-N, N-dimethylthiocarbamoyl tetrasulfide, 3-triethoxysilylpropyl-N, N-dimethylthiocarbamoyl tetrasulfide, 2-triethoxysilylethyl-N, N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-trimethoxysilylpropyl methacrylate monosulfide, and 3-triethoxysilylpropyl methacrylate monosulfide; mercapto-based silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-based silane coupling agents such as vinyltriethoxysilane, and vinyltrimethoxysilane; amino-based silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-based silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents such as 3-nitropropyltrimethoxysilane, and 3-nitropropyltriethoxysilane; chloro-based silane coupling agents such as 3-chloropropyltrimethoxysilane, 3-chloropropyltriethoxysilane, 2-chloroethyltrimethoxysilane, and 2-chloroethyltriethoxysilane. Such silane coupling agents may be used singly or in combination.

Among those shown above, such as Si69 (manufactured by Evonik Degussa Japan. Co., Ltd.) (bis(3-triethoxysilylpropyl) tetrasulfide) and Si266 (manufactured by Evonik Degussa Japan. Co., Ltd.) (bis(3-triethoxysilylpropyl)disulfide) are preferably employed because they have good processability.

When the rubber composition is subjected to further contain a silane coupling agent, the content thereof is not particularly limited, but the content of the silane coupling agent is preferably 2% by mass or more, and more preferably 4% by mass or more when the content of silica is let be 100% by mass. When the content of the silane coupling agent is less than 2% by mass, the processabilities in kneading and extruding of rubber tend to deteriorate and, at the same time, the flexural fatigue resistance in a resulting sidewall rubber tends to decrease. The content of the silane coupling agent based on 100% by mass of silica is preferably 12% by mass or less, and more preferably 10% by mass or less. When the content of the silane coupling agent exceeds 12% by mass, it is not economical due to increase in cost though only a small effect of improving the processabilities in kneading and extruding of rubber are obtained, and the heat resisting property in a resulting sidewall rubber tends to deteriorate.

<Other Compounding Agents>

In the rubber composition for sidewalls of the present invention, other compounding agents which are conventionally used in the rubber industry, such as vulcanizing agents, stearic acid, vulcanizing accelerators, vulcanization accelerating auxiliary agents, oils, hardened resins, waxes and antioxidants, may be compounded in addition to the components described supra.

As the vulcanizing agent, an organic peroxide or a sulfur-based vulcanizing agent may be used and as the organic peroxide, for example, benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3 or 1,3-bis(t-butylperoxypropyl)benzene, di-t-butylperoxy-diisopropylbenzene, t-butylperoxybenzene, 2,4-dichlorobenzoyl peroxide, 1,1-di-t-butylperoxy-3,3,5-trimethylsiloxiane, and n-butyl-4,4-di-t-butylperoxyvalerate can be used. Among them, dicumyl peroxide, tert-butyl peroxybenzene and di-tert-butyl peroxy-diisopropylbenzene are preferred. In addition, as sulfur-based vulcanizing agents, such as sulfur and morpholine disulfide can be used. In particular, sulfur is preferred. Such vulcanizing agents may be used singly or in combination.

As the vulcanizing accelerator, any accelerator may be employed that contains at least one of sulfenamide based vulcanization accelerator, thiazole based vulcanization accelerator, thiuram based vulcanization accelerator, thiourea based vulcanization accelerator, guanidine based vulcanization accelerator, dithiocarbamate based vulcanization accelerator, aldehyde-amine based or aldehyde-ammonia based vulcanization accelerator, imidazoline based vulcanization accelerator and xanthate based vulcanization accelerator. As the sulfenamide-based vulcanization accelerators, sulfenamide compounds such as CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide, and N,N-diisopropyl-2-benzothiazolesulfenamide can be used. As the thiazole-based vulcanization accelerator, thiazole-based compounds such as MBT (2-mercaptobenzothiazole), MBTS (dibenzothiazyl disulfide), a sodium salt, a zinc salt or a copper salt of 2-mercaptobenzothiazole, a cyclohexylamine salt, 2-(2,4-dinitrophenyl)mercaptobenzothiazole, and 2-(2,6-diethyl-4-morpholinothio)benzothiazole can be used. As the thiuram-based vulcanization accelerator, thiuram-based compounds such as TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, and pentamethylenethiuram tetrasulfide can be used. As the thiourea-based vulcanization accelerator, thiourea compounds such as thiacarbamide, diethylthiourea, dibutylthiourea, trimethylthiourea, and diorthotolylthiourea can be used. As the guanidine-based vulcanization accelerator, guanidine-based compounds such as diphenylguanidine, diorthotolylguanidine, triphenylguanidine, orthotolylbiguanide, and diphenylguanidine phthalate can be used. As the dithiocarbamic acid-based vulcanization accelerator, dithiocarbamic acid-based compounds such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecyl (or octadecyl)isopropyldithiocarbamate, zinc dibenzyldithiocarbamate, sodium diethyldithiocarbamate, pentamethylenedithiocarbamic acid piperidine, selenium dimethyldithiocarbamate, tellurium diethyldithiocarbamate, and cadmium diamyldithiocarbamate can be used. As the aldehyde-amine-based or aldehyde-ammonia-based vulcanization accelerator, aldehyde-amine-based or aldehyde-ammonia-based compounds such as an acetoaldehyde-aniline reaction product, a butylaldehyde-aniline condensate, hexamethylenetetramine, and an acetoaldehyde-ammonia reaction product can be used. As the imidazoline-based vulcanization accelerator, imidazoline-based compounds such as 2-mercaptoimidazoline can be used. As the xanthate-based vulcanization accelerator, xanthate-based compound such as zinc dibutylxanthogenate can be used. Such vulcanizing accelerators may be used singly or in combination.

As a vulcanization accelerating auxiliary agent, such as zinc oxide and stearic acid can be used, for example.

As the antioxidant, such as amine based antioxidants, phenol based antioxidants, imidazole based antioxidants, and metal carbamates may be used by appropriate selection.

Examples of the oil include such as a process oil, a vegetable oil, and a mixture thereof. Examples of the process oil include such as a paraffin-based process oil, a naphthene-based process oil, and an aromatic-based process oil. Examples of the vegetable oil include such as a castor oil, a cotton seed oil, a linseed oil, a rapeseed oil, a soybean oil, a palm oil, a coconut oil, a peanut oil, a pine oil, a pine tar, a tall oil, a corn oil, a rice oil, a safflower oil, a sesame oil, an olive oil, a sunflower oil, a palm kernel oil, a camellia oil, a jojoba oil, a macadamia nut oil, a safflower oil, and a paulownia oil.

In the rubber composition for sidewalls of the present invention, it is preferable that the durometer A hardness after crosslinking is 50 or less. This is because when the durometer A hardness exceeds 50, the rubber for sidewalls is so hard that the flex crack growth resistance of a pneumatic tire tends to deteriorate. It is more preferable that the durometer A hardness is 48 or less. On the other hand, the durometer A hardness is preferably 40 or more, more preferably 42 or more, and particularly preferably 45 or more because when the durometer A hardness is less than 40, the durability of a pneumatic tire tends to deteriorate.

Here, it is noted that the durometer A hardness is a value measured according to JIS K6253.

The present invention also provides a pneumatic tire provided with a sidewall rubber produced using the aforementioned rubber composition for sidewalls of the present invention. Here, FIG. 1 is a sectional view showing the left half of a pneumatic tire according to the present invention. A pneumatic tire 1 is provided with a tread portion 2, a pair of sidewall portions 3 extending inwardly in the radial direction of the tire from both ends of tread portion 2, and a bead portion 4 located at the inner end of each sidewall portion 3. In addition, a carcass 6 is provided to extend between bead portions 4, 4, and at the same time, a belt layer 7 having hoop effect to reinforce tread portion 2 is further provided outside of this carcass 6 and in tread portion 2.

Carcass 6 is formed of at least one carcass ply having a carcass cord arranged at an angle of for example, 70 to 90° relative to a tire equator CO. This carcass ply extends from tread portion 2 to a bead core 5 of bead portion 4 via sidewall portion 3 and further extends around bead core 5 where the carcass ply is folded back from the inside to the outside relative to the direction of the tire axis to be secured.

Belt layer 7 is formed of at least two belt plies having belt cords arranged at an angle of, for example, 40° or less relative to tire equator CO. Belt plies are stacked on each other so that each belt cords embedded in the belt plies cross in different directions from each other. A band layer (not shown) for preventing both end portions of belt layer 7 from lifting may, if necessary, be provided at least outside belt layer 7. In this event, the band layer is formed of a continuous ply having an organic fiber cord of low modulus wound in a spiral manner almost in parallel with tire equator CO.

In addition, in bead portion 4, a bead apex rubber 8 is arranged to extend from bead core 5 outwardly in the radial direction, and at the same time, an inner liner rubber 9 is provided adjacent to the inside of carcass 6 to form a tire inner surface. The outside of carcass 6 is protected by a clinch apex rubber 4G and a sidewall rubber 3G. The rubber composition for sidewalls of the present invention is a product to be used for the sidewall rubber 3G.

Although FIG. 1 illustrates a pneumatic tire for passenger cars, the present invention is not limited to this and provides pneumatic tires which are used for various types of vehicles, such as passenger cars, trucks, buses and heavy vehicles.

The pneumatic tire of the present invention is produced by a conventional process using the rubber composition for sidewalls of the present invention. Namely, the rubber composition for sidewalls in which the above-described essential ingredients and other compounding agents which are optionally blended are contained is kneaded. Then, it is extruded and processed in conformity with the shape of a sidewall rubber of a tire at an unvulcanized stage, and molded on a tire molding machine by a usual process to form an unvulcanized tire. The pneumatic tire of the present invention can be obtained by heat-pressurizing this unvulcanized tires in a vulcanizer.

In the pneumatic tire of the present invention, the sidewall rubber contains reduced amounts of components derived from petroleum resources, sufficient considerations are given to resource savings and environmental protection, and at the same time, a rubber composition having both reduced tan δ and satisfactory tensile strength and elongation at break is used as a sidewall rubber. Therefore, according to the present invention, a tire can be provided which is a global environment-friendly "ecological tire" and at the same time, which exerts low fuel consumption and excellent durability due to simultaneous achievement of reduced rolling resistance and satisfactory flex crack growth resistance.

The present invention will be described in more detail below by way of examples and comparative examples, but the invention is not limited to the examples.

EXAMPLES 1 TO 6 AND COMPARATIVE EXAMPLES 1 TO 5

According to the compounding formulations shown in Tables 1 and 2, the compounding ingredients except for sulfur and a vulcanization accelerator were kneaded at about 150° C. for 3 minutes using a Banbury mixer. Then, sulfur and a vulcanization accelerator were added to the resulting kneaded materials in the compounding amounts shown in Tables 1 and 2, and kneaded at about 80° C. for 5 minutes using a twin-axis open roll to yield unvulcanized rubber compositions having formulation according to each Example and each Comparative Example.

The unvulcanized rubber compositions obtained above were extruded into a predetermined thickness to yield unvulcanized rubber sheets, which were then vulcanized at 175° C. for 10 minutes to yield vulcanized rubber sheets.

On the other hand, the unvulcanized rubber compositions obtained above were extruded into the shape of a sidewall and then were combined with other members to form tires, which were then vulcanized at a temperature of 150° C. and a pressure of 25 kgf for 35 minutes in a tire molding machine, yielding test tires (size: 195/65R15).

<Rubber Property Evaluation>
(Durometer A Hardness)

For vulcanized rubber sheets prepared by the method described above, the durometer A hardness was measured at room temperature according to JIS K6253. (E* (complex modulus), tan δ (loss tangent))

For specimens having a size of 4.0 mm×2.0 mm×40 mm cut out from vulcanized rubber sheets prepared by the method described above, an E* (unit: MPa) and a tan δ were measured using a viscoelasticity spectrometer manufactured by Iwamoto Corporation under the conditions of a temperature of 70° C., an initial strain of 10% and a dynamic strain of 2%.
(Tensile Strength TB, Elongation at Break EB)

For No. 3 dumbbell type specimens cut out from vulcanized rubber sheets prepared by the method described above, a tensile strength TB (MPa) and an elongation at break EB (%) were measured at room temperature according to HS K6251.

(De Mattia Flexing Test)

For specimens having a length of 140-155 mm and a width of 25±0.1 mm cut out from the vulcanized rubber sheets prepared by the method described above, flex crack growing rates were measured using De Mattia flexing testing machine by varying the strain ratio according to JIS K6260. The measurement results were expressed by the number of flexings× 10,000 (times) until a crack grows up to 1 mm. The larger the value is, the better the flex crack growth resistance is.

<Evaluation of Tire>

(Steering Stability Performance)

Test tires produced by the method described above were mounted on a Toyota Corolla and a steering stability performance test in actual driving was conducted in a tire test course of Sumitomo Rubber Industries, Ltd. A test driver implemented a sensory evaluation and the result was evaluated according to the following criteria.

S: The steering response is tolerable and a supple ride is provided.

A: Both the steering response and the ride comfort are at the lower limits allowed.

B: Both the steering response and the ride comfort are beyond allowed levels.

(Rolling Resistance Index)

For a test tire produced by the method described above, the rolling resistance was measured with a rolling resistance measuring machine. The rolling resistance was represented as an index to the rolling resistance of Comparative Example 2 as 100 according to the following equation: rolling resistance index=(rolling resistance of individual Example or Comparative Example)/(rolling resistance of Comparative Example 2)×100. The smaller the index, the smaller the rolling resistance is and the more advantageous for reducing fuel consumption it is.

(Durability)

A test tire produced by the method described above was driven 30,000 km by evaluation on a drum using a drum testing machine and then the tire was taken apart. The condition of the damage of the sidewall was visually observed and the result was evaluated according to the following criteria.

A: A sidewall is not damaged.

B: A sidewall is damaged.

TABLE 1

|  |  | Example 1 | Example 2 | Example 3 | Example 4 | Example 5 | Example 6 |
|---|---|---|---|---|---|---|---|
| Formulation (parts by mass) | Natural rubber (Note 1) | 70 | 70 | 70 | 70 | 70 | 70 |
|  | Epoxidized natural rubber (Note 2) | 30 | 30 | 30 | 30 | 30 | 30 |
|  | Butadiene rubber (Note 3) | — | — | — | — | — | — |
|  | Carbon black (Note 4) | 4 | 4 | 4 | 4 | 4 | 4 |
|  | Silica (Note 5) | 40 | 30 | 15 | 30 | 30 | 30 |
|  | Calcium carbonate (Note 6) | 5 | 15 | 30 | — | — | 30 |
|  | Clay (Note 7) | — | — | — | 15 | — | — |
|  | Aluminum hydroxide (Note 8) | — | — | — | — | 15 | — |
|  | Silane coupling agent (Note 9) | 3.6 | 3.6 | 3.6 | 3.6 | 3.6 | 3.6 |
|  | Aromatic oil (Note 10) | — | — | — | — | — | — |
|  | Vegetable oil (Note 11) | 6 | 6 | 6 | 6 | 6 | 6 |
|  | Antioxidant 1 (Note 12) | 1.5 | 1.5 | 1.5 | 1.5 | 1.5 | 1.5 |
|  | Antioxidant 2 (Note 13) | 2.5 | 2.5 | 2.5 | 2.5 | 2.5 | 2.5 |
|  | Stearic acid (Note 14) | 2 | 2 | 2 | 2 | 2 | 2 |
|  | Zinc oxide (Note 15) | 3 | 3 | 3 | 3 | 3 | 3 |
|  | Sulfur (Note 16) | 1.5 | 1.5 | 1.5 | 1.5 | 1.5 | 1.5 |
|  | Vulcanization accelerator NS (Note 17) | 1.0 | 1.0 | 1.0 | 1.0 | 1.0 | 1.0 |
| Evaluation | Durometer A hardness | 48 | 47 | 46 | 47 | 47 | 53 |
|  | E* | 3.2 | 3.1 | 3.1 | 3.2 | 3.0 | 4.0 |
|  | tanδ | 0.148 | 0.144 | 0.140 | 0.145 | 0.144 | 0.150 |
|  | Tensile strength TB (MPa) | 16.5 | 16.0 | 15.4 | 15.8 | 15.6 | 14.5 |
|  | Elongation at break EB (%) | 640 | 590 | 540 | 580 | 560 | 420 |
|  | De Mattia test (10,000 times/1 mm) | 3500 | 2500 | 1500 | 1600 | 1200 | 500 |
|  | Steering stability | A | A | A | A | A | S-A |
|  | Rolling resistance index | 97 | 96 | 95 | 96 | 96 | 97 |
|  | Durability | A | A | A | A | A | B |

TABLE 2

|  |  | Comparative Example 1 | Comparative Example 2 | Comparative Example 3 | Comparative Example 4 | Comparative Example 5 |
|---|---|---|---|---|---|---|
| Formulation (parts by mass) | Natural rubber (Note 1) | 50 | 50 | 50 | 70 | 70 |
|  | Epoxidized natural rubber (Note 2) | — | — | — | 30 | 30 |
|  | Butadiene rubber (Note 3) | 50 | 50 | 50 | — | — |
|  | Carbon black (Note 4) | 60 | 50 | 5 | 5 | 4 |
|  | Silica (Note 5) | — | — | 45 | 45 | 10 |
|  | Calcium carbonate (Note 6) | — | — | — | — | 35 |
|  | Clay (Note 7) | — | — | — | — | — |
|  | Aluminum hydroxide (Note 8) | — | — | — | — | — |
|  | Silane coupling agent (Note 9) | — | — | 3.6 | 3.6 | 3.6 |
|  | Aromatic oil (Note 10) | 6 | 6 | 6 | — | — |
|  | Vegetable oil (Note 11) | — | — | — | 6 | 6 |
|  | Antioxidant 1 (Note 12) | 1.5 | 1.5 | 1.5 | 1.5 | 1.5 |
|  | Antioxidant 2 (Note 13) | 2.5 | 2.5 | 2.5 | 2.5 | 2.5 |

TABLE 2-continued

|  |  | Comparative Example 1 | Comparative Example 2 | Comparative Example 3 | Comparative Example 4 | Comparative Example 5 |
|---|---|---|---|---|---|---|
|  | Stearic acid (Note 14) | 2 | 2 | 2 | 2 | 2 |
|  | Zinc oxide (Note 15) | 3 | 3 | 3 | 3 | 3 |
|  | Sulfur (Note 16) | 1.5 | 1.5 | 1.5 | 1.5 | 1.5 |
|  | Vulcanization accelerator NS (Note 17) | 1.0 | 1.0 | 1.0 | 1.0 | 1.0 |
| Evaluation | Durometer A hardness | 53 | 48 | 48 | 48 | 46 |
|  | E* | 4.3 | 3.3 | 3.2 | 3.2 | 3.1 |
|  | tanδ | 0.180 | 0.165 | 0.150 | 0.150 | 0.138 |
|  | Tensile strength TB (MPa) | 18.5 | 17.0 | 16.0 | 17.0 | 14.8 |
|  | Elongation at break EB (%) | 480 | 610 | 640 | 650 | 480 |
|  | De Mattia test (10,000 times/1 mm) | 1000 | 6000 | 4500 | 4000 | 800 |
|  | Steering stability | S-A | A | A | A | A |
|  | Rolling resistance index | 102 | 100 | 98 | 98 | 94 |
|  | Durability | A | A | A | A | B |

(Note 1) to (Note 17) in Tables 1 and 2 are as follows:
(Note 1) Natural rubber (NR): TSR
(Note 2) Epoxidized natural rubber (ENR): ENR25 (manufactured by Kumplan Guthrie Berhad) (epoxidation ratio: 25%)
(Note 3) Butadiene rubber: BR1220 (manufactured by UBE INDUSTRIES, LTD.)
(Note 4) Carbon black: SHOWBLACK N330 (manufactured by CABOT JAPAN K.K.) (BET specific surface area: 79 $m^2/g$)
(Note 5) Silica: VN2 (BET specific surface area: 125 $m^2/g$) (manufactured by Evonik Degussa Japan. Co., Ltd.)
(Note 6) Calcium carbonate: Hakuenka CC (manufactured by Shiraishi Calcium Kaisha, Ltd.)
(Note 7) Clay: Satintone W (manufactured by Takehara Kagaku Kogyo Co., Ltd.)
(Note 8) Aluminium hydroxide: HIGILITE H21 (manufactured by Toshin Chemicals Co., Ltd.)
(Note 9) Silane coupling agent: Si69 (manufactured by Evonik Degussa Japan. Co., Ltd.)
(Note 10) Aromatic oil: Process oil X140 (manufactured by Japan Energy Corporation)
(Note 11) Vegetable oil: Rapeseed oil (manufactured by NISSIN KASEI CO., LTD.)
(Note 12) Antioxidant 1: SANNOC N (manufactured by Ouchi Shinko Chemical Industrial Co., Ltd.)
(Note 13) Antioxidant 2: NOCRAC 6C (manufactured by Ouchi Shinko Chemical Industrial Co., Ltd.)
(Note 14) Stearic acid: Stearic acid (manufactured by Nippon Oil & Fats Co., Ltd.)
(Note 15) Zinc oxide: Zinc white No. 1 (manufactured by Mitsui Mining and Smelting Co., Ltd.)
(Note 16) Sulfur: Sulfur Powder (manufactured by Tsuruami Chemical Industry Co., Ltd.)
(Note 17) Vulcanization accelerator NS: NOCCELER NS (manufactured by Ouchi Shinko Chemical Industrial Co., Ltd.)

As shown in Tables 1 and 2, in Examples 1 to 6 according to formulation of the rubber composition for sidewalls of the present invention, an effect of reducing in rolling resistance due to reduction in tan δ was recognized in comparison with Comparative Examples 1 and 2, which contain no inorganic filler other than carbon black, and Comparative Examples 3 and 4, which contain no inorganic filler other than carbon black and silica. It was also found that the tensile strength and the elongation at break were superior in comparison to Comparative Example 5, in which a large amount of calcium carbonate was contained, and that the flex crack growth resistance and the durability of a tire tended to be good.

The results given above shows that according to the present invention, it is possible to obtain both low rolling resistance and satisfactory flex crack growth resistance simultaneously while reducing the used amount of raw materials derived from petroleum resources.

The rubber composition for sidewalls of the present invention can be applied suitably for sidewall portions of pneumatic tires for various applications such as passenger cars, trucks, buses and heavy vehicles. The pneumatic tire of the present invention can be applied suitably for the aforementioned various applications.

It should be construed that the embodiments and the Examples shown herein are non-limiting and only illustrative. It is intended that the scope of the present invention includes not only the description provided above but all meanings equivalent to the claims and all modifications within the range of equivalence to the claims.

The invention claimed is:

1. A rubber composition for sidewalls comprising:
   100 parts by mass of a rubber component,
   5 parts by mass or less of carbon black,
   10 to 40 parts by mass of silica, and
   5 to 30 parts by mass of an inorganic filler component composed of at least one kind selected from the group consisting of clay, sericite, talc, aluminum hydroxide, and magnesium carbonate,
   wherein said rubber component consists of a natural rubber and an epoxidized natural rubber having an epoxidization ratio of 20 to 70 mol %, wherein an amount of the natural rubber in the rubber component is 60% by mass or more and 70% by mass or less.

2. The rubber composition for sidewalls according to claim 1, wherein the durometer A hardness after crosslinking is 50 or less.

3. A pneumatic tire having a sidewall formed from the rubber composition for sidewalls according to claim 1.

4. The pneumatic tire according to claim 3, wherein the durometer A hardness after crosslinking is 50 or less.

5. The rubber composition for sidewalls according to claim 1, wherein the carbon black is present in an amount of 1 to 5 parts by mass.

6. The pneumatic tire according to claim 3, wherein the carbon black is present in an amount of 1 to 5 parts by mass.

7. The rubber composition for sidewalls according to claim 1, further comprising calcium carbonate.

* * * * *